(12) United States Patent
Ren

(10) Patent No.: US 8,705,638 B2
(45) Date of Patent: Apr. 22, 2014

(54) METHOD FOR SIGNAL TRANSMISSION AND USER EQUIPMENT

(75) Inventor: Tianmin Ren, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 28 days.

(21) Appl. No.: 13/258,989

(22) PCT Filed: May 18, 2010

(86) PCT No.: PCT/CN2010/072873
§ 371 (c)(1),
(2), (4) Date: Feb. 10, 2012

(87) PCT Pub. No.: WO2011/017954
PCT Pub. Date: Feb. 17, 2011

(65) Prior Publication Data
US 2012/0128083 A1   May 24, 2012

(30) Foreign Application Priority Data
Aug. 11, 2009   (CN) .......................... 2009 1 0164097

(51) Int. Cl.
H04L 27/00   (2006.01)
(52) U.S. Cl.
USPC ....................................................... 375/259
(58) Field of Classification Search
None
See application file for complete search history.

(56) References Cited

U.S. PATENT DOCUMENTS

| 8,265,212 B2 * | 9/2012 | Hum et al. .................. 375/347 |
|---|---|---|
| 2005/0101259 A1 * | 5/2005 | Tong et al. ..................... 455/69 |
| 2006/0018415 A1 * | 1/2006 | Jung et al. .................... 375/347 |
| 2008/0187062 A1 * | 8/2008 | Pan et al. ...................... 375/260 |
| 2008/0298482 A1 * | 12/2008 | Rensburg et al. ............. 375/260 |
| 2009/0046569 A1 * | 2/2009 | Chen et al. .................... 370/203 |
| 2009/0122857 A1 * | 5/2009 | Li et al. ......................... 375/239 |
| 2009/0285325 A1 * | 11/2009 | Zhou ............................. 375/267 |
| 2010/0002598 A1 * | 1/2010 | Pan et al. ...................... 370/252 |
| 2010/0067616 A1 * | 3/2010 | Chun et al. .................... 375/295 |
| 2011/0149765 A1 * | 6/2011 | Gorokhov et al. ............ 370/252 |

FOREIGN PATENT DOCUMENTS

| CN | 101146078 A | 3/2008 |
|---|---|---|
| CN | 101291163 A | 10/2008 |
| CN | 101330357 A | 12/2008 |
| CN | 101626262 A | 1/2010 |
| KR | 1020080052900 A | 12/2006 |

OTHER PUBLICATIONS

DavidJ. Love, and Robert W. Heath, Jr., "Limited Feedback Unitary Precoding for Spatial Multiplexing Systems", IEEE Transactions on Information Theory, vol. 51, No. 8, Aug. 2005.*

(Continued)

Primary Examiner — Chieh M Fan
Assistant Examiner — Bahman Badipour
(74) Attorney, Agent, or Firm — McGarry Bair PC

(57) ABSTRACT

The present invention discloses a method for signal transmission and a user equipment (UE), wherein said method comprises: user equipment UE calculating an MSE of a first layer of signal and an MSE of a second layer of signal; the UE selecting a pre-coding matrix from a plurality of pre-coding matrices according to the sum of the MSE of the first layer of signal and the MSE of the second layer of signal; and the UE informing a base station to use the selected pre-coding matrix to transmit signals. By way of the present invention, the correct transmission of signals is ensured, the block error rate of the system is reduced, and the throughput of the system is improved.

8 Claims, 3 Drawing Sheets

(56) References Cited

OTHER PUBLICATIONS

TD-Tech; Adaptive Precoding Matrix Index Feedback for MIMO Downlink in TDD; Agenda; Nov. 5-9, 2007; 7 pages; 3GPP TSG-RAN WG1 #50bis; Jeju, Korea.

3GPP; 3rd Generation Partnership Project; Technical Specification Group Radio Access Network; Evolved Universal Terrestrial Radio Access (E-UTRA); Physical Channels and Modulation (Release 8); journal; May 2009; 94 pages; Valbonne, France.

* cited by examiner

METHOD FOR SIGNAL TRANSMISSION AND USER EQUIPMENT

CROSS-REFERENCE TO RELATED APPLICATIONS

This application is a National Phase application of International Application No. PCT/CN2010/072873 filed on May 18, 2010, which claims the benefit of Chinese Patent Application No. 200910164097.9, filed Aug. 11, 2009, both of which are incorporated herein by reference in their entirety.

FIELD OF THE INVENTION

The present invention relates to the communication field, and in particular to a method for signal transmission and a user equipment (UE).

BACKGROUND OF THE INVENTION

The multiple antennae input multiple antennae output (abbreviated as MIMO) technology is a key technology of the 3rd Generation (abbreviated as 3G), 4th Generation (abbreviated as 4G), and even the future broadband wireless communication. The MIMO technology can be divided into two categories: open loop MIMO technology and closed loop MIMO technology. The closed loop MIMO technology can significantly improve the system capacity, but it needs to obtain the information of the transmission channels. In the closed loop MIMO technology, the transmitters select suitable transmission modes according to the characteristics of the transmission channels.

In the LTE protocol, when the user equipment (abbreviated as UE) works in closed loop MIMO mode with space multiplexing, the UE needs to select an optimal (for example, which maximizes the system throughput) pre-coding matrix from a set of pre-coding matrices specified in advance and use this pre-coding matrix to transmit signals. When the number of transmission antennas is greater than that of the layers of the transmission signal, the selection of the pre-coding matrix has an optimal solution which can be proved theoretically, such as maximized system capacity selection method and the selection method of maximizing the correlation with the right eigen-matrix of the channel. However, these methods are inapplicable when the number of transmission antennas is equal to that of the layers of the transmission signal. In the LTE system, one commonly used antenna configuration is that a base station (NodeB) is equipped with 2 transmission antennas and the UE with 2 receiving antennas. The NodeB uses the spatial multiplexing mode and transmits 2 layers of signal at the same time. The UE needs to select 1 optimal pre-coding matrix from 2 pre-coding matrices for feeding back to the NodeB. Under this situation, the number of transmission antennas is equal to that of the signal layers. The LTE proposition provides a method for selecting an optimal pre-coding matrix when the number of transmission antennas is equal to that of the signal layers, which is as follows:

$$i = \arg\max(\log(1/c^{(i)}_{00}) + \log(1/c^{(i)}_{11}))$$

This method is based on the maximized system capacity criterion for an MMSE receiver, wherein $c^{(i)}_{00}$ and $c^{(i)}_{11}$ are respectively the mean squared error (abbreviated as MSE) of the $0^{th}$ and $1^{st}$ layer of the signal when using pre-coding matrix i. This method effectively maximizes the MSE difference of the 2 layers. The performance of this algorithm is relatively poor when being applied in an LTE system when the number of transmission antennas is equal to that of the signal layers. Although it is possible for a layer of signal with low MSE to pass through when the spatial characteristics of the channel are poor, it would cause another layer with high MSE to be received in error when the spatial characteristics of the channels are good. In addition, there is another method for selecting a pre-coding matrix applied in an LTE system when the number of transmission antennas is equal to that of the signal layers, in which the MSE difference of the 2 layers is minimized.

However, in practical application, it is often difficult to decide when to use the maximized MSE difference method and when to use the even MSE method. That is, it is difficult to select the better pre-coding matrix. Therefore, the system performance is compromised.

SUMMARY OF THE INVENTION

The present invention is proposed regarding the problem in the related art that the user equipment (UE) is unable to decide when to use the maximized MSE difference method and when to use the even MSE method and thus the system performance is not optimized. To this end, the present invention provides a method for signal transmission and a UE so as to solve at least one of the above problems.

A method for signal transmission is provided according to one aspect of the present invention.

The method for signal transmission according to the present invention comprises: a UE calculating an MSE of the first layer of signal and an MSE of the second layer of signal; the UE selecting a pre-coding matrix from a plurality of pre-coding matrices according to the sum of the MSE of the first layer of signal and the MSE of the second layer of signal; and the UE informing the base station to use the selected pre-coding matrix to transmit signals.

Preferably, the UE selecting a pre-coding matrix from a plurality of pre-coding matrices according to the sum of the MSE of the first layer of signal and the MSE of the second layer of signal comprises: when $c^{(i)}_{00} + c^{(i)}_{11} > t$, the UE selecting a pre-coding matrix which enables the noise of a layer of signal with good channel to be minimized from a plurality of pre-coding matrices, wherein $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, and t is a set threshold.

Preferably, the UE selects a pre-coding matrix which enables the noise of a layer of signal with good channel to be minimized from a plurality of pre-coding matrices according to the following formula: $i = \arg\min(\min(c^{(i)}_{00}, c^{(i)}_{11}))$, wherein i is the index number of a pre-coding matrix, min represents taking the minimum value, arg min represents the value of i that minimizes $\min(c^{(i)}_{00}, c^{(i)}_{11})$.

Preferably, the UE selecting a pre-coding matrix from a plurality of pre-coding matrices according to the sum of the MSE of the first layer of signal and the MSE of the second layer of signal comprises: when $c^{(i)}_{00} + c^{(i)}_{11} < t$, the UE selecting a pre-coding matrix which enables the noise of the layer of signal with poor channel to be minimized from a plurality of pre-coding matrices. In this case, $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, and t is a set threshold.

Preferably, the UE selects a pre-coding matrix which enables the noise of a layer of signal with poor channel to be minimized from a plurality of pre-coding matrices according to the following formula: $i = \arg\min(\max(c^{(i)}_{00}, c^{(i)}_{11}))$, wherein i is the index number of a pre-coding matrix, max represents taking the maximum value, arg min represents the value of i that minimizes the value of $\max(c^{(i)}_{00},c^{(i)}_{11})$.

Preferably, the UE calculates the MSE of the first layer of signal and the MSE of the second layer of signal according to the following formula:

$$C = \begin{pmatrix} c_{00} & c_{01} \\ c_{10} & c_{11} \end{pmatrix} = (W^H H^H HW/N_0 + I)^{-1},$$

wherein $c_{00}$ represents the MSE of the first layer of signal, $c_{11}$ represents the MSE of the second layer of signal, $c_{01}$ and $c_{10}$ have no physical meaning, W is an optional pre-coding matrix, H is a channel matrix, $N_0$ is the noise variance, I is the unit matrix, $W^H$ represents complex conjugation of W, and $H^H$ represents complex conjugation of H.

A user equipment (UE) is provided according to another aspect of the present invention.

The UE according to the present invention comprises: a calculation module adapted to calculate the mean squared error MSE of the first layer of signal and the MSE of the second layer of signal; a selection module adapted to select a pre-coding matrix from a plurality of pre-coding matrices according to the sum of the MSE of the first layer of signal and the MSE of the second layer of signal; and a feedback module adapted to inform the base station to use the selected pre-coding matrix to transmit signals.

Preferably, the selection module comprises: a first selection sub-module adapted to, when $c^{(i)}_{00}+c^{(i)}_{11}>t$, selects the pre-coding matrix which enables the noise of a layer of signal with good channel to be minimized from a plurality of pre-coding matrices according to formula $i=\arg\min(\min(c^{(i)}_{00},c^{(i)}_{11}))$, wherein $c^{(i)}_{00}$ is the MSE of the first layer of) signal when using the $i^{th}$ pre-coding matrix, $c^{(i)}_{11}$ is the MSE of the second layer of signal when using the $i^{th}$ pre-coding matrix, and t is a set threshold, and wherein in the formula $i=\arg\min(\min(c^{(i)}_{00},c^{(i)}_{11}))$, i is the index number of a pre-coding matrix, min represents taking the minimum value, arg min represents the value of i that minimizes $\min(c^{(i)}_{00},c^{(i)}_{11})$.

Preferably, the selection module further comprises: a second selection sub-module adapted to, when $c^{(i)}_{00}+c^{(i)}_{11}<t$, select a pre-coding matrix which enables the noise of a layer of signal with poor channel to be minimized from a plurality of pre-coding matrices according to formula $i=\arg\min(\max(c^{(i)}_{00},c^{(i)}_{11}))$, wherein $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, and t is a pre-acquired threshold, and wherein in the formula $i=\arg\min(\max(c^{(i)}_{00},c^{(i)}_{11}))$, i is the index number of a pre-coding matrix, max represents to take the maximum value, arg min represents the value of i that minimizes $\max(c^{(i)}_{00},c^{(i)}_{11})$.

Preferably, the calculation module calculates the MSE of the first layer of signal and the MSE of the second layer of signal according to the following formula:

$$C = \begin{pmatrix} c_{00} & c_{01} \\ c_{10} & c_{11} \end{pmatrix} = (W^H H^H HW/N_0 + I)^{-1},$$

wherein $c_{00}$ represents the MSE of the first layer of signal, $c_{11}$ represents the MSE of the second layer of signal, $c_{01}$ and $c_{10}$ have no physical meaning, W is an optional pre-coding matrix, H is a channel matrix, $N_0$ is the noise variance, I is a unit matrix, $W^H$ represents complex conjugation of W, and $H^H$ represents complex conjugation of H.

By way of the present invention, the UE calculates the MSE of the first layer of signal and the MSE of the second layer of signal, selects the pre-coding matrix from a plurality of pre-coding matrices according to the sum of the MSE of the first layer of signal and the MSE of the second layer of signal, and informs the base station to use the selected pre-coding matrix to transmit signals. It solves the problem in the related art that the UE is unable to decide when to use the maximized MSE difference method and when to use the even MSE method and thus the correct transmission of signals cannot be ensured, thus reducing the block error rate of the system and improving the throughput of the system.

BRIEF DESCRIPTION OF THE DRAWINGS

The drawings illustrated here provide a further understanding of the present invention and form a part of the present application. The exemplary embodiments and the description thereof are used to explain the present invention and not to unduly limit the scope of the present invention. In the drawings.

DETAILED DESCRIPTION OF THE EMBODIMENTS

The embodiments of the present invention provide a solution for signal transmission, and during implementation, it is found that the sums of the MSEs of two layers of signal of the minimum mean squared error (MMSE) receiver are the same and different pre-coding matrices cause different distributions of the MSE between 2 layers of signal, the MSEs of these 2 layers of signal are used as the criterion of selecting a pre-coding matrix, i.e. the pre-coding matrix is selected according to the spatial characteristics of the channels. The processing principles are as follows: calculate the MSE of the first layer of signal and the MSE of the second layer of signal in two layers of signal; and select a pre-coding matrix from a plurality of pre-coding matrices according to the sum of the MSE of the first layer of signal and the MSE of the second layer of signal so that a base station transmits signals according to the selecting pre-coding matrix. By way of this embodiment, the MSE is most balanced when the spatial characteristics of the channels are good, and at this moment the signals with high MSE also can be correctly received; and the difference is maximized vice versa.

It needs to note that the embodiments of the present application and the features in the embodiments can be combined with each other if there is no conflict. The present invention is described in detail with reference to the drawings and in combination with the embodiments in the following.

In the following embodiments, the steps shown in the flow charts of the drawings can be executed in a computer system such as a set of computer executable instructions. Although the logical order is shown in the flow charts, in some cases, the steps shown or described can be carried out in a different order.

Method Embodiments

Figure 1:
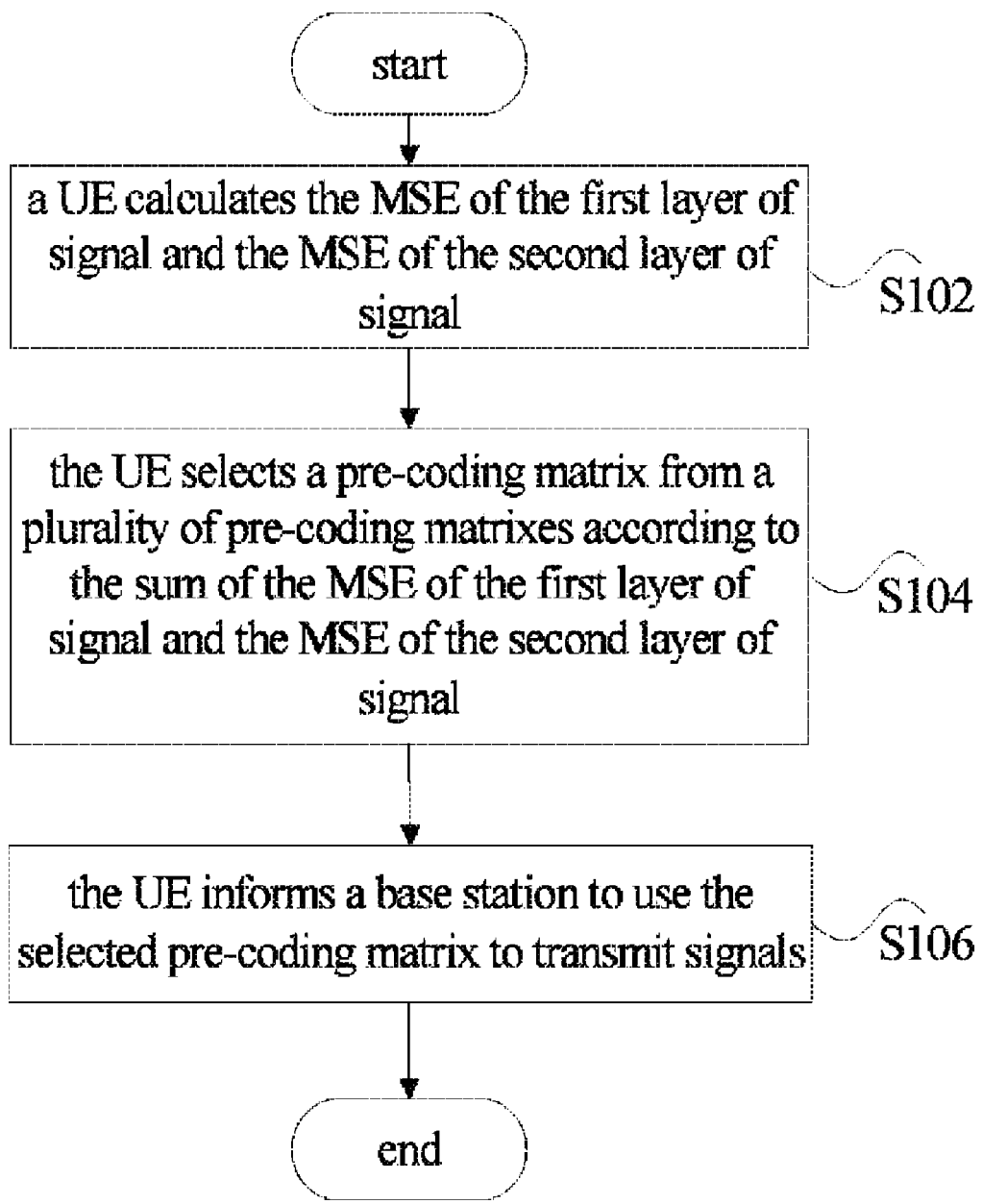
FIG. 1 is a flow chart of a method for signal transmission according to the embodiments of the present invention.

A method for signal transmission is provided according to the embodiments of the present invention, and FIG. 1 is a flow chart of a method for signal transmission according to the embodiments of the present invention. As shown in FIG. 1, this method comprises the following steps S102 to S106.

Step S102: a UE calculates the MSE of the first layer of signal and the MSE of a second layer of signal in two layers of signal.

Step S104: the UE selects a pre-coding matrix from a plurality of pre-coding matrices according to the sum of the MSE of the first layer of signal and the MSE of the second layer of signal.

In this step, the UE uses the sum of the MSE of the first layer of signal and the MSE of the second layer of signal as the criterion of using maximized MSE or even MSE and selects a pre-coding matrix from a plurality of pre-coding matrices.

Step S106: the UE informs a base station to use the selected pre-coding matrix to transmit signals.

In the related art, the UE is unable to decide when to use the maximized MSE difference method and when to use the even MSE method, thus the correct transmission of signals cannot be ensured. By way of this embodiment, the UE selects the most rational pre-coding matrix from a plurality of pre-coding matrices according to the sum of the MSE of the first layer of signal and the MSE of the second layer of signal, and informs the base station to use this selected pre-coding matrix to transmit signals; and therefore, the correct transmission of signals is ensured.

In step S104, when $c^{(i)}_{00}+c^{(i)}_{11}>t$, the UE selects a pre-coding matrix which enables the noise of a layer of signals with relatively good channel to be minimized from a plurality of pre-coding matrices, wherein $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, and t is a set threshold and the threshold t can be obtained by simulation or can also be preset. In this case, a pre-coding matrix which enables the noise of a layer of signal with relatively good channels in two layers of signal to be minimized from a plurality of pre-coding matrices can be selected according to the following formula: $i=\arg\min(\min(c^{(i)}_{00},c^{(i)}_{11}))$, wherein i is the index number of a pre-coding matrix, min represents taking the minimum value, and arg min represents the value of i that minimizes $\min(c^{(i)}_{00},c^{(i)}_{11})$.

In step S104, when $c^{(i)}_{00}+c^{(i)}_{11}<t$, the UE selects a pre-coding matrix which enables the noise of a layer of signal with relatively poor channel in two layers of signals to be minimized from a plurality of pre-coding matrices, wherein $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, and t is a set threshold, wherein the pre-coding matrix which enables the noise of a layer of signal with relatively poor channel in two layers of signals to be minimized from a plurality of pre-coding matrices can be selected according to the following formula $i=\arg\min(\max(c^{(i)}_{00},c^{(i)}_{11}))$: wherein i is the index number of a pre-coding matrix, max represents taking the maximum value, and arg min represents the value of i that minimizes $\max(c^{(i)}_{00},c^{(i)}_{11})$.

In step S102, the MSE of the first layer of signal and the MSE of the second layer of signal can be calculated according to the following formula:

$$C = \begin{pmatrix} c_{00} & c_{01} \\ c_{10} & c_{11} \end{pmatrix} = (W^H H^H H W / N_0 + I)^{-1},$$

wherein $c_{00}$ represents the MSE of the first layer of signals, $c_{11}$ represents the MSE of the second layer of signals, $c_{01}$ and $c_{10}$ have no physical meaning, W is an optional pre-coding matrix, H is a channel matrix, $N_0$ is the noise variance, I is a unit matrix, $W^H$ represents complex conjugation of W, and $H^H$ represents complex conjugation of H.

The implementation process of the embodiments of the present invention will be described in detail in conjunction with examples hereinafter.

The MSEs of 2 layers of signal from the MMSE receiver are used as the criterion of selecting a pre-coding matrix, in which the MSEs of 2 layers of signal can be calculated as follows:

$$C = \begin{pmatrix} c_{00} & c_{01} \\ c_{10} & c_{11} \end{pmatrix} = (W^H H^H H W / N_0 + I)^{-1}$$

wherein $c_{00}$ and $c_{11}$ are respectively the MSE of the $0^{th}$ and $1^{st}$ layers of signal, W is an optional pre-coding matrix, H is a channel matrix, $N_0$ is the noise variance, I is a unit matrix, $W^H$ represents complex conjugation of W, $H^H$ represents complex conjugation of H, and the values of $c_{01}$ and $c_{10}$ have no physical meaning.

The sum of $c_{00}$ and $c_{11}$ are the same for different pre-coding matrices.

When the MSE is used as the criterion, there are two opposite selection modes according to the spatial characteristics of the channel. When the spatial characteristics of the channel are good (the sum of the MSEs of two layers of signal is relatively small), we can select a pre-coding matrix to enable the MSEs of two layers of signal to be relatively even; and when the spatial characteristics of the channel are poor, we should select a pre-coding matrix to enable a smaller MSE of two layers of signal to be minimized, i.e. to ensure that one layer of signal can be received correctly.

Step 1: calculate $$C^{(i)} = \begin{pmatrix} c^{(i)}_{00} & c^{(i)}_{01} \\ c^{(i)}_{10} & c^{(i)}_{11} \end{pmatrix} = (W_i^H H^H H W_i / N_0 + I)^{-1}$$

wherein $c^{(i)}_{00}$ and $c^{(i)}_{11}$ are the MSE of the $0^{th}$ and $1^{st}$ layer of signal respectively when using the pre-coding matrix i.

Step 2: if $c^{(i)}_{00}+c^{(i)}_{11}>t$, i.e. the spatial characteristics of the channel are poor, the selected pre-coding matrix should enable the noise of one layer of signal with relatively better channel to be minimized, i.e. to make one layer of signal to pass through as much as possible, wherein the channel being relatively better means the noise is relatively small. At this moment, a pre-coding matrix can be selected according to the following formula, $$i=\arg\min(\min(c^{(i)}_{00},c^{(i)}_{11})),$$

wherein i is the index number of the selected pre-coding matrix; and the selection of the threshold t should be obtained by simulation. That is, different thresholds are simulated under different channel conditions to select the best value therefrom.

Otherwise, when $c^{(i)}_{00}+c^{(i)}_{11}<=t$, i.e. the spatial characteristics of the channel are good, the selected pre-coding matrix should enable the noise of one layer of signal with relatively poorer channel to be minimized, i.e. to make two layers of signal to pass through as much as possible, wherein the channel being relatively poorer means the noise is relatively bigger. At this moment, a pre-coding matrix can be selected according to the following formula, $$i=\arg\min(\max(c^{(i)}_{00},c^{(i)}_{11})).$$

Step 3: the UE informs a base station to use the selected pre-coding matrix to transmit signals.

Figure 2:
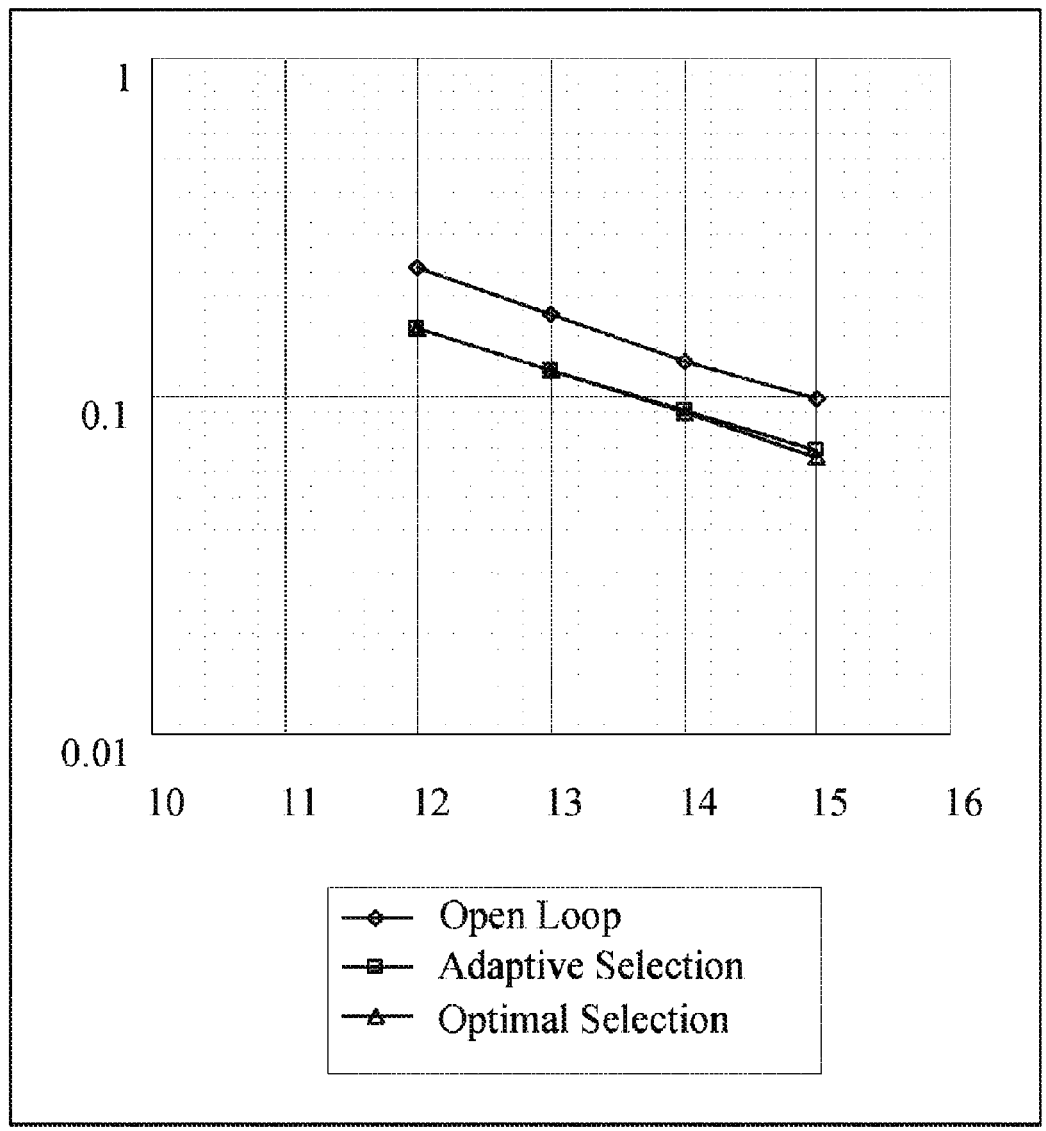
FIG. 2 is a curve chart of performance simulation according to the embodiments of the present invention.

By way of this embodiment, as to transmission of closed loop MIMO mode with multiplexed space of 2 transmission antennae and 2 layers of signal, adaptively selects the selection criterion of the pre-coding matrix according to the channel characteristics. FIG. 2 is a curve chart of performance simulation according to the embodiments of the present invention, and as shown in FIG. 2, the horizontal coordinate is SNR (Signal to Noise Ratio) (the unit is dB) and the vertical coordinate is BLER (BLock Error Rate). In this case, "Open Loop" indicates that the pre-coding matrix is selected randomly and it will not change any more after being selected. "Optimal Selection" is to perform 2 simulations to the same channel, and different pre-coding matrices are used each time and the minimum BLER of the 2 simulations is selected. That is, it is assumed that it is the BLER obtained when selecting the optimal pre-coding matrix each time. "Adaptive Selection" is an algorithm in this embodiment. It can be known from FIG. 2 that the performance of the algorithm of this embodiment is very close to be optimal.

Apparatus Embodiments

Figure 3:
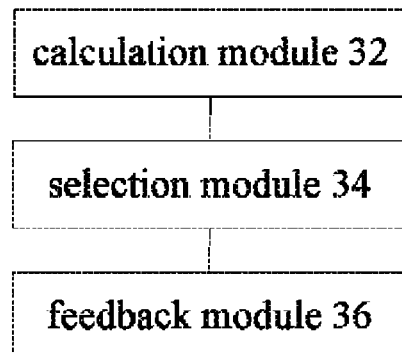
FIG. 3 is a block diagram of the structure of a UE according to the embodiments of the present invention.

A user equipment (UE) is provided according to the embodiments of the present invention, and FIG. 3 is a block diagram of the structure of UE according to the embodiments of the present invention. The apparatus comprises a calculation module 32, a selection module 34, and a feedback module 36. The structure of the apparatus will be described in detail hereinafter.

The calculation module 32 is adapted to calculate an MSE of the first layer of signal and an MSE of the second layer of signals respectively in two layers of signal; the selection module 34, connected to the calculation module 32, is adapted to select a pre-coding matrix from a plurality of pre-coding matrices according to the sum of the MSE of the first layer of signal and the MSE of the second layer of signal; and the feedback module 36 is adapted to inform a base station to use the selected pre-coding matrix to transmit signals.

Figure 4:
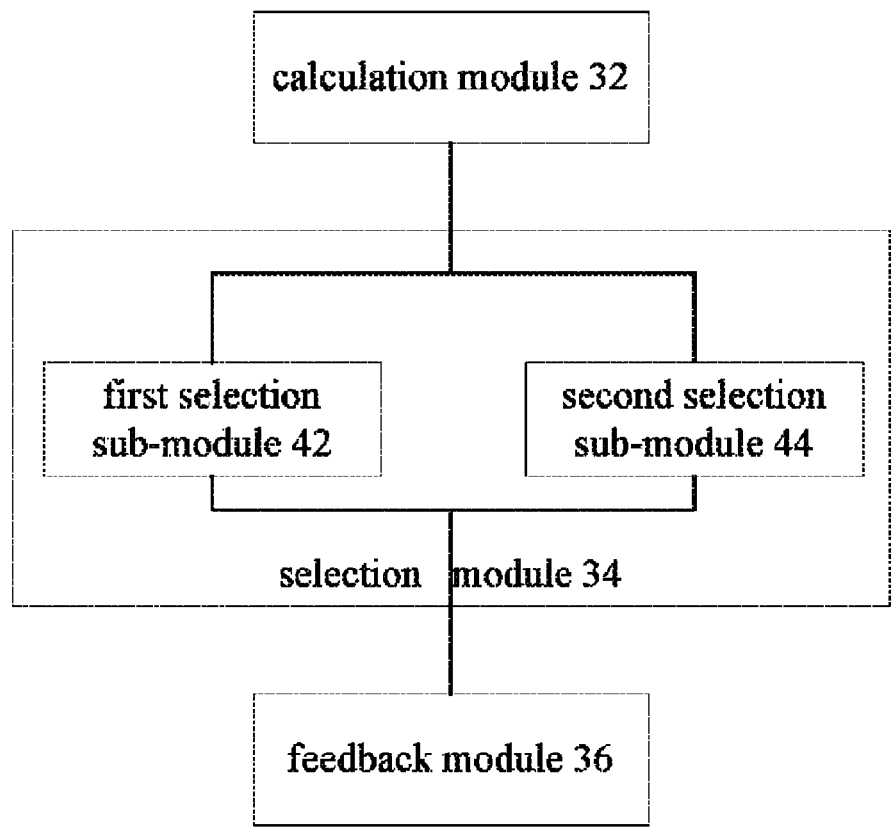
FIG. 4 is a block diagram of the structure of another UE according to the embodiments of the present invention.

FIG. 4 is a block diagram of the structure of an optimized UE according to the embodiment shown in FIG. 3 of the present invention, in which, the selection module 34 comprises: a first selection sub-module 42 and a second selection sub-module 44.

The first selection sub-module 42 is adapted to, when $c^{(i)}_{00}+c^{(i)}_{11}>t$, select a pre-coding matrix which enables the noise of a layer of signals with relatively better channels in the two layers of signals to be minimized from a plurality of pre-coding matrices according to formula $i=\arg\min(\min(c^{(i)}_{00},c^{(i)}_{11}))$, wherein $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, t is a pre-acquired threshold, i is the index number of a pre-coding matrix, min represents to take the minimum value, and arg min represents the value of i that minimizes $\min(c^{(i)}_{00},c^{(i)}_{11})$.

The second selection sub-module 44 is adapted to, when $c^{(i)}_{00}+c^{(i)}_{11}<t$, select a pre-coding matrix which enables the noise of a layer of signals with poor channels in the two layers of signal to be minimized from a plurality of pre-coding matrices according to formula $i=\arg\min(\max(c^{(i)}_{00},c^{(i)}_{11}))$, wherein $c^{(i)}_{00}$ is the MSE of the first layer of) signal when using the $i^{th}$ pre-coding matrix, $c^{(i)}_{11}$ is the MSE of the second layer of signal when using the $i^{th}$ pre-coding matrix, t is a pre-acquired threshold, i is the index number of a pre-coding matrix, max represents to take the maximum value, and arg min represents the value of i that minimizes $\max(c^{(i)}_{00},c^{(i)}_{11})$.

The calculation module 32 calculates the MSE of the first layer of signal and the MSE of the second layer of signal according to the following formula:

$$C = \begin{pmatrix} c_{00} & c_{01} \\ c_{10} & c_{11} \end{pmatrix} = (W^H H^H H W / N_0 + I)^{-1},$$

wherein $c_{00}$ represents the MSE of the first layer of signal, $c_{11}$ represents the MSE of the second layer of signal, $c_{01}$ and $c_{10}$ have no physical meaning, W is an optional pre-coding matrix, H is a channel matrix, $N_0$ is the noise variance, I is a unit matrix, $W^H$ represents complex conjugation of W, and $H^H$ represents complex conjugation of H.

In summary, by way of the above embodiments of the present invention, it solves the problem in relevant art that the method for selecting a pre-coding matrix cannot be applied in transmission with 2 antennas and 2 layers of signal in the LTE or the performance is poor. And it reduces the block error rate of the system and improves the throughput.

Apparently, those skilled in the art should understand that the above-mentioned modules and steps of the present invention can be realized by using general purpose calculating device, can be integrated in one calculating device or distributed on a network which consists of a plurality of calculating devices. And alternatively, they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:
1. A method for signal transmission, comprising:
a user equipment (UE) calculating a mean squared error (MSE) of a first layer of signal and an MSE of a second layer of signal;
the UE selecting a pre-coding matrix from a plurality of pre-coding matrices according to the sum of the MSE of the first layer of signal and the MSE of the second layer of signal; and
the UE informing a base station to use the selected pre-coding matrix to transmit signals, wherein the UE selecting a pre-coding matrix from a plurality of pre-coding matrices according to the sum of the MSE of the first layer of signal and the MSE of the second layer of signal comprises:

when $c^{(i)}_{00}+c^{(i)}_{11}>t$, the UE selecting a pre-coding matrix which enables the noise of a layer of signal with good channel to be minimized from the plurality of pre-coding matrices, wherein $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, and t is a set threshold, wherein the UE selects a pre-coding matrix which enables the noise of a layer of signal with good channel to be minimized from the plurality of pre-coding matrices according to the formula of:

$i=\arg \min(\min(c^{(i)}_{00},c^{(i)}_{11}))$, wherein i is the index number of a pre-coding matrix, min represents taking the minimum value, arg min represents the value of i that minimizes $\min(c^{(i)}_{00},c^{(i)}_{11})$.

2. The method according to claim 1, wherein the UE selecting a pre-coding matrix from a plurality of pre-coding matrices according to the sum of the MSE of the first layer of signal and the MSE of the second layer of signal comprises:

when $c^{(i)}_{00}+c^{(i)}_{11}<t$, the UE selecting a pre-coding matrix which enables the noise of a layer of signal with poor channels in the two layers of signal to be minimized from the plurality of pre-coding matrices, wherein $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, and t is a set threshold, wherein the UE selects a pre-coding matrix which enables the noise of a layer of signal with poor channel to be minimized from the plurality of pre-coding matrices according to the formula of:

$i=\arg \min(\max(c^{(i)}_{00},c^{(i)}_{11}))$, wherein i is the index number of a pre-coding matrix, max represents taking the maximum value, arg min represents the value of i that minimizes $\max(c^{(i)}_{00},c^{(i)}_{11})$.

3. A user equipment (UE), comprising:

a calculation module adapted to calculate a mean squared error (MSE) of a first layer of signal and an MSE of a second layer of signal respectively;

a selection module adapted to select a pre-coding matrix from a plurality of pre-coding matrices according to the sum of the MSE of the first layer of signal and the MSE of the second layer of signal; and a feedback module adapted to inform a base station to use the selected pre-coding matrix to transmit signals, wherein the selection module comprises:

a first selection sub-module adapted to, when $c^{(i)}_{00}+c^{(i)}_{11}>t$, select a pre-coding matrix which enables the noise of a layer of signals with good channel to be minimized from the plurality of pre-coding matrices according to formula $i=\arg \min(\min(c^{(i)}_{00},c^{(i)}_{11}))$, wherein $c^{(i)}_{00}$ is the MSE of the first layer of signal when using the ith pre-coding matrix, $c^{(i)}_{11}$ is the MSE of the second layer of signal when using the ith pre-coding matrix, and t is a set threshold, wherein in the formula $i=\arg \min(\min(c^{(i)}_{00},c^{(i)}_{11}))$, i is the index number of a pre-coding matrix, min represents taking the minimum value, and arg min represents the value of i that minimizes $\min(c^{(i)}_{00},c^{(i)}_{11})$.

4. The UE according to claim 3, wherein the selection module further comprises:

a second selection sub-module adapted to, when $c^{(i)}_{00}+c^{(i)}_{11}<t$, select a pre-coding matrix which enables the noise of a layer of signals with poor channel to be minimized from the plurality of pre-coding matrices according to formula $i=\arg \min(\max(c^{(i)}_{00},c^{(i)}_{11}))$, wherein $c^{(i)}_{00}$ is the MSE of the first layer of signal when using the $i^{th}$ pre-coding matrix, $c^{(i)}_{11}$ is the MSE of the second layer of signal when using the $i^{th}$ pre-coding matrix, and t is a pre-acquired threshold, wherein in the formula $i=\arg \min(\max(c^{(i)}_{00},c^{(i)}_{11}))$, i is the index number of a pre-coding matrix, max represents taking the maximum value, and arg min represents the value of i that minimizes $\max(c^{(i)}_{00},c^{(i)}_{11})$.

5. The method according to claim 1, wherein the UE calculates the MSE of the first layer of signal and the MSE of the second layer of signal according to the formula of:

$$C = \begin{pmatrix} c_{00} & c_{01} \\ c_{10} & c_{11} \end{pmatrix} = (W^H H^H H W / N_0 + I)^{-1},$$

wherein $c_{00}$ represents the MSE of the first layer of signal, $c_{11}$ represents the MSE of the second layer of signal, $c_{01}$ and $c_{10}$ have no physical meaning, W is an optional pre-coding matrix, H is a channel matrix, $N_0$ is the noise variance, I is a unit matrix, $W^H$ represents complex conjugation of W, and $H^H$ represents complex conjugation of H.

6. The method according to claim 2, wherein the UE calculates the MSE of the first layer of signal and the MSE of the second layer of signal according to the formula of:

$$C = \begin{pmatrix} c_{00} & c_{01} \\ c_{10} & c_{11} \end{pmatrix} = (W^H H^H H W / N_0 + I)^{-1},$$

wherein $c_{00}$ represents the MSE of the first layer of signal, $c_{11}$ represents the MSE of the second layer of signal, $c_{01}$ and $c_{10}$ have no physical meaning, W is an optional pre-coding matrix, H is a channel matrix, $N_0$ is the noise variance, I is a unit matrix, $W^H$ represents complex conjugation of W, and $H^H$ represents complex conjugation of H.

7. The UE according to claim 3, wherein the calculation module calculates the MSE of the first layer of signal and the MSE of the second layer of signal according to the formula of:

$$C = \begin{pmatrix} c_{00} & c_{01} \\ c_{10} & c_{11} \end{pmatrix} = (W^H H^H H W / N_0 + I)^{-1},$$

wherein $c_{00}$ represents the MSE of the first layer of signal, $c_{11}$ represents the MSE of the second layer of signal, $c_{01}$ and $c_{10}$ have no physical meaning, W is an optional pre-coding matrix, H is a channel matrix, $N_0$ is the noise variance, I is a unit matrix, $W^H$ represents complex conjugation of W, and $H^H$ represents complex conjugation of H.

8. The UE according to claim 4, wherein the calculation module calculates the MSE of the first layer of signal and the MSE of the second layer of signal according to the formula of:

$$C = \begin{pmatrix} c_{00} & c_{01} \\ c_{10} & c_{11} \end{pmatrix} = (W^H H^H HW/N_0 + I)^{-1},$$

wherein $c_{00}$ represents the MSE of the first layer of signal, $c_{11}$ represents the MSE of the second layer of signal, $c_{01}$ and $c_{10}$ have no physical meaning, W is an optional pre-coding matrix, H is a channel matrix, $N_0$ is the noise variance, I is a unit matrix, $W^H$ represents complex conjugation of W, and $H^H$ represents complex conjugation of H.

* * * * *